(12) United States Patent
Stuart et al.

(10) Patent No.: US 8,107,035 B2
(45) Date of Patent: Jan. 31, 2012

(54) LASER BACKLIGHTING FOR DISPLAYS

(75) Inventors: Chris Stuart, Fremont, CA (US); Allen Massie Earman, Santa Clara, CA (US); Greg Niven, Santa Clara, CA (US)

(73) Assignee: Necsel Intellectual Property, Milpitas, CA (US)

( * ) Notice: Subject to any disclaimer, the term of this patent is extended or adjusted under 35 U.S.C. 154(b) by 194 days.

(21) Appl. No.: 12/106,017

(22) Filed: Apr. 18, 2008

(65) Prior Publication Data

US 2008/0259247 A1  Oct. 23, 2008

Related U.S. Application Data

(60) Provisional application No. 60/925,676, filed on Apr. 19, 2007.

(51) Int. Cl.
*G02F 1/1335* (2006.01)
*H01S 3/14* (2006.01)
*G09G 3/36* (2006.01)

(52) U.S. Cl. ............... 349/64; 372/39; 372/96; 345/102
(58) Field of Classification Search ....................... None
See application file for complete search history.

(56) References Cited

U.S. PATENT DOCUMENTS

| | | | |
|---|---|---|---|
| 5,954,424 A * | 9/1999 | Anderson et al. | 362/242 |
| 7,262,758 B2 * | 8/2007 | Kahen et al. | 345/102 |
| 2004/0101008 A1 * | 5/2004 | Kurtz et al. | 372/39 |
| 2005/0146285 A1 * | 7/2005 | Lurkens | 315/224 |

* cited by examiner

*Primary Examiner* — Tina Wong
(74) *Attorney, Agent, or Firm* — Douglas L. Weller

(57) ABSTRACT

Displays such as LCD panels are illuminated using frequency-doubled vertical extended cavity surface emitting lasers (VECSELs) as efficient light sources. Visible light from the VECSELs are directed to an illuminating panel using optical fibers and/or optical gratings to provide substantially uniform illumination of the illuminating panel. Visible light from the illuminating panel, which can be provided at a particular number of primary wavelengths by the VECSELs, is then used to illuminate the display.

20 Claims, 15 Drawing Sheets

LASER BACKLIGHTING FOR DISPLAYS

CROSS-REFERENCE TO RELATED APPLICATIONS

This application claims the benefit of U.S. Provisional Application No. 60/925,676 filed on Apr. 19, 2007, the disclosure of which is incorporated herein by reference in its entirety.

FIELD OF THE INVENTION

The present invention relates to a method and apparatus for illuminating a display, such as a liquid crystal display panel, using lasers.

BACKGROUND OF THE INVENTION

There is significant interest in improving display technology for use in a variety of consumer products. For example, HDTV technology uses high resolution displays. Large-format flat panel displays also are of increasing interest. Other examples of products which use display technologies include laptop computers and cell phones.

Display technology can be categorized into several types of systems. For example, there are direct view systems in which an image is viewed at a viewing surface proximal to the location where the image is produced. Examples of direct view systems include cathode ray tube displays, plasma displays, and liquid crystal displays (LCDs). There are also projection systems, in which an image is viewed by reflection and/or transmission on a surface remotely situated from where the image is produced. Examples of projection systems include rear projection televisions, front projectors, and cinema applications.

One example of a direct view system is a backlit LCD system. Direct view systems that utilize LCDs typically use a cold cathode fluorescent lamp (CCFL) as a light source to backlight the LCD. Monochrome LCD displays also may use electroluminescent lamps and/or organic LEDs (OLEDs) as backlights. In order to provide good illumination uniformity, the CCFL typically extends over a large portion of the area of the LCD panel, making it a large, expensive and fragile component within the display. Color filters which also extend across the full area of the screen typically are used to obtain red, green, and blue (RGB) colors from the CCFL, which is a white light source. The LCD panel then controls the transmission of the CCFL light through the display to convey an image to the viewer.

A conventional LCD panel is arranged as a two-dimensional matrix of pixels. In a backlit LCD system, a liquid crystal material controls the light transmission through each pixel of the LCD panel, typically in an analog fashion, from near zero to a maximum value. The transmissivity of the liquid crystal is changed by rotating the polarization state of light as it passes between two polarizers. The degree of polarization rotation induced by the liquid crystal material determines the amount of transmission and thus the brightness of a given pixel, and is controlled by electrically addressing each pixel. A direct view LCD system can include millions of individual pixels. For example, the XGA video format has a display resolution of 1,024×768 pixels, or 786,432 total pixels. There are many other available display formats, including several with higher resolutions.

Conventional polychromatic backlit LCD systems include pixels which typically are divided into 3 subpixels. Each subpixel has a color filter which allows transmission of a single color, which is typically red, green, or blue. The bandwidth of the filter transmission provides a trade-off between improved color saturation and definition for a narrower bandwidth, and a brighter display for a wider bandwidth. For example, a narrower filter bandwidth tends to provide richer, more saturated colors and a wider color gamut. However, as the filter bandwidth is decreased, the amount of light generated by the CCFL within that bandwidth decreases and therefore the display brightness decreases for a given CCFL power. A filter bandwidth of tens of nanometers allows reasonable transmission when using a broad spectrum illumination source such as a CCFL.

Red, green, and blue filters in polychromatic backlit LCD systems are typically arranged in alternate bands of vertical stripes which cover the entire image area. As an illustrative example, image formation may be achieved using scanning techniques similar to those used in CRT systems. For example, an image may be formed by adjusting transmission of pixels in a given row, such as the top row. The transmission of each subpixel is individually adjusted. The transmission of pixels in other rows are then adjusted according to a sequence. For example, the transmission of pixels in an adjacent row may be sequentially adjusted. Alternatively, a row could be skipped and returned to later in a subsequent scan using an interleaving pattern. In general, the procedure of adjusting the transmission in pixels of particular rows is continued until an entire image is scanned.

Conventional backlit LCD systems have several drawbacks. One drawback is that color gamut and color saturation are generally not sufficiently high, due to the trade-off between color filter bandwidth and display brightness. Also, color gamut can change with time as the CCFL or other lamp ages and the lamp output intensity spectrum changes. For example, a CCFL lamp has a limited lifetime before the overall output power decreases sufficiently to reduce the display brightness below acceptable levels. Further, the optical efficiency of such LCD systems is relatively low because most of the light is produced by the lamp is not transmitted by the color filters and/or polarization filters, and is therefore not used for displaying images.

There is increasing interest is using light emitting diodes (LEDs) as a light source for backlit LCD systems. LEDs can be up to 15% efficient at converting electricity into light. An array of LEDs can include diodes having red, green and blue emission wavelengths. Each LED typically has a center wavelength that varies from device to device (and from lot-to-lot) with a typical spectral width of about 20 to 30 nanometers. An LED can emit light over a comparatively large range of angles, often in a nearly hemispheric pattern. However, the combination of 3-color LED arrays and the color filters used in LCD panels tends to exhibit a limited color saturation and color gamut because the LED output is spectrally broad and therefore has difficulty recreating precise saturated colors. The combination of LED arrays and the color filters used in LCD panels provides a significant improvement in brightness and efficiency when compared to the use of a CCFL light source because less light energy is filtered out and thus unused in the color filters. However, as described above, the color reproduction and display quality may still not be sufficiently high.

Therefore, a need exists for methods and apparatus which can provide improved illumination of LCD panels which address the shortcomings of conventional LCD systems described above.

SUMMARY OF THE INVENTION

Embodiments of the present invention provide methods and apparatus for illuminating displays using certain lasers.

More particularly, the present invention describes the use of vertical extended cavity surface emitting lasers (VECSELs) as efficient light sources for the illumination of liquid crystal display panels and other displays.

In a first aspect, embodiments of the invention involve a display apparatus which includes a laser source that further includes a plurality of frequency-doubled VECSELs. The VECSELs are configured to generate visible light at least one primary wavelength. In certain embodiments, the visible light is generated at three primary wavelengths. In further embodiments, the visible light is generated at more than three primary wavelengths. Visible light at each of the primary wavelengths can optionally be generated by a plurality of the frequency-doubled VECSELs. The visible light can be emitted from the laser source through a single aperture.

The display apparatus includes an optical coupling arrangement which directs the visible light onto an illuminating panel, which can be the back panel for an LCD panel or the like. The optical coupling arrangement preferably includes an optical diffuser which is configured to distribute the visible light over at least a substantial portion of the back panel to provide substantially uniform illumination thereof. The diffuser can be an optical grating, a Fresnel lens, a cylindrical lens, or the like. The optical diffuser can be provided along one side of the back panel, or at a corner of the back panel. Optionally, a plurality of diffusers can be used. These diffusers can be provided along a plurality of sides and/or corners of the back panel.

The optical coupling arrangement can further include a plurality of optical fibers, which direct the visible light from the laser source to the diffusers. The optical diffusers can be notches in the optical fibers, abraded surfaces of the optical fibers, or spatially-separated distal ends of the optical fibers.

The display apparatus can also include a transmissive display panel, such as an LCD panel. Alternatively, the display apparatus can include a reflective display panel, such as an "electronic ink" or "electronic paper" panel.

In a further aspect, embodiments of the present invention provide a method for illuminating a display panel, the method including: providing a laser source which includes a plurality of frequency-doubled VECSELs for generating visible light at one or more primary wavelengths; providing an optical coupling arrangement; and directing the visible light from the laser source onto an illuminating panel using the optical coupling arrangement, where the optical coupling arrangement distributes the visible light over the illuminating panel to illuminate the display. The display can be a transmissive display such as an LCD, or a reflective display.

BRIEF DESCRIPTION OF THE DRAWINGS

Further objects, features and advantages of the invention will become apparent from the following detailed description taken in conjunction with the accompanying FIGS. showing illustrative embodiments, results and/or features of the present invention, in which.

Figure 1:
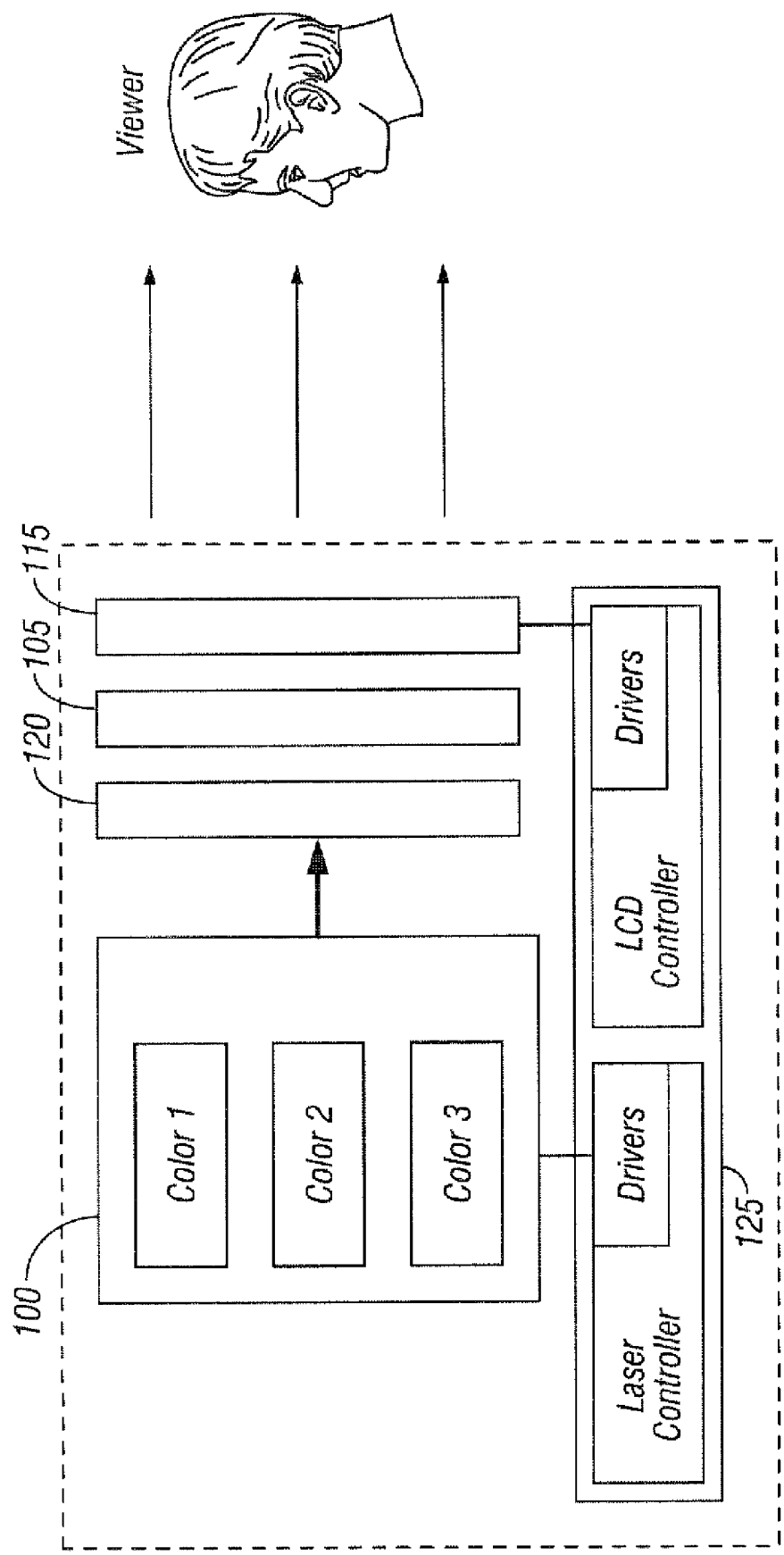
FIG. 1 is a schematic illustration of a laser-illuminated backlit LCD system.

Throughout the drawings, the same reference numerals and characters, unless otherwise stated, are used to denote like features, elements, components, or portions of the illustrated embodiments. Moreover, while the present invention will now be described in detail with reference to the figures, it is done so in connection with the illustrative embodiments and is not limited by the particular embodiments illustrated in the figures.

DETAILED DESCRIPTION OF EMBODIMENTS OF THE INVENTION

In one aspect, embodiments of the present invention provide a display system which includes an LCD panel illuminated by one or more laser sources. In one embodiment, illustrated in FIG. 1, a backlit LCD system is shown which includes a laser source 100 that further includes one or more sets or arrays of lasers. The laser source 100 is used as an illumination source and is optically coupled to a back panel 105 of an LCD panel 115 by an optical coupler 120.

The back panel 105 may be a conventional back panel used in conventional CCFL-illuminated transmissive LCD systems. For example, a back panel 105 used in conventional LCD systems are configured to spread and diffuse light for uniform illumination of the LCD panel 115, and may be referred to as "diffusers." However, the back panel 105 may be modified in embodiments of the present invention to have a different number and/or composition of diffuser layers than a conventional back panel used in CCFL illuminated LCD systems.

Because laser sources generally emit light having a narrow beam divergence (e.g., the beam divergence of a laser source is typically less than that of an LED or a white light lamp and the emission generally originates from a small area as compared to a CCFL illumination system, the optical coupler 120 is preferably disposed between the laser source 100 and the back panel 105 of the LCD panel 115. The optical coupler 120 can be configured to spread or distribute the incident laser light over the area of the back panel 105. For example, the optical coupler 120 may distribute light from the laser source 100 to more than one portion of the back panel 105 to improve the uniformity of the illumination of the LCD matrix 115.

The laser source 100 provides light having at least one color. In certain embodiments with a color display, as illustrated in FIG. 1, there are at least three colors such as red, green, and blue (RGB). Controllers and drivers 125 are provided to control the operation of the laser source 100 and the LCD panel 115.

In many laser-based projection display systems, speckle is a serious problem. It has been observed that speckle is not a problem in a backlit LCD system illuminated by certain frequency doubled semiconductor lasers. Semiconductor lasers have a high coherence and narrow spectral linewidth as compared with LEDs and CCFLs. In contrast to laser-based projection display systems, no observable speckle was seen in an LCD panel backlit by arrays of frequency-doubled vertical extended cavity surface emitting lasers (VECSELs). This surprising lack of observable speckle may have several causes. For example, one factor that may reduce speckle involves multiple scatterings in a back panel, which can destroy the coherence of the laser light. Such multiple scattering is utilized in embodiments of the present invention to provide uniform illumination of the LCD panel using laser sources having a narrow divergence and small emitting area.

Certain VECSELs exhibit properties that make them particularly suitable for backlit LCD systems. Examples of such VECSELs are described, e.g., in U.S. Pat. Nos. 6,243,407, 6,404,797, 6,614,827, 6,778,582, 6,898,225, and 7,357,513, and in U.S. patent application Ser. Nos. 11/136,071, 10/899, 779, 11/193,317, 11/194,077, 11/194,141, and 11/396,289. VECSELs generally have internal grating structures that can stabilize the optical frequency. They are also compatible with high power operation, tend to exhibit a comparatively symmetric and low-divergence emission pattern, and permit efficient intra-cavity frequency doubling to generate light at various colors, such as green and blue light. The ability to tailor, or design, the output wavelength of a frequency-doubled (FD) VECSEL allows optimization of the display color gamut and luminous efficiency. This combination of FD VECSEL properties provides significant advantages in the use of such FD VECSEL lasers for the illumination of LCD panels as compared with other available laser technologies.

Figure 2:
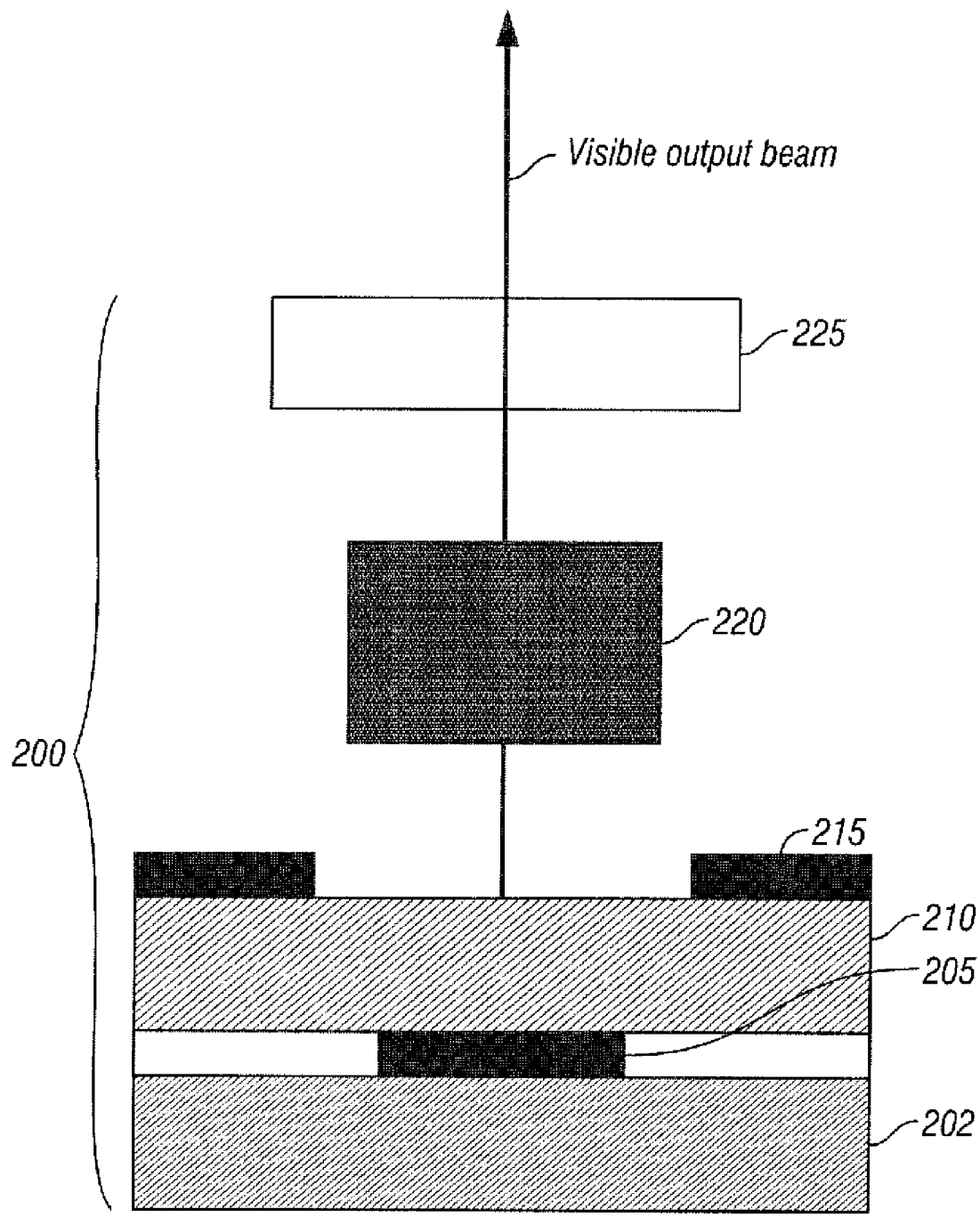
FIG. 2 is a schematic illustration of a frequency doubled monolithic VECSEL source.

FIG. 2 illustrates details of an exemplary VECSEL source 200. The VECSEL source 200 includes a submount 202, a P contact electrode 205, a semiconductor layer 210, an N-contact electrode 215, and a doubling crystal 220. Spectral stabilization is provided by a volume Bragg grating integrated into an external mirror 225. A thin film dielectric filter (not shown) can also be used as spectral filter to stabilize the output spectrum. Both volume Bragg gratings (VBG) and thin film dielectric filters can be mass produced in large quantity at low cost. Other variations of this VECSEL source 200 are described in the patents and patent applications cited herein above. Such VECSELs may optionally include a thermal lens to improve cavity stability.

Figure 3:
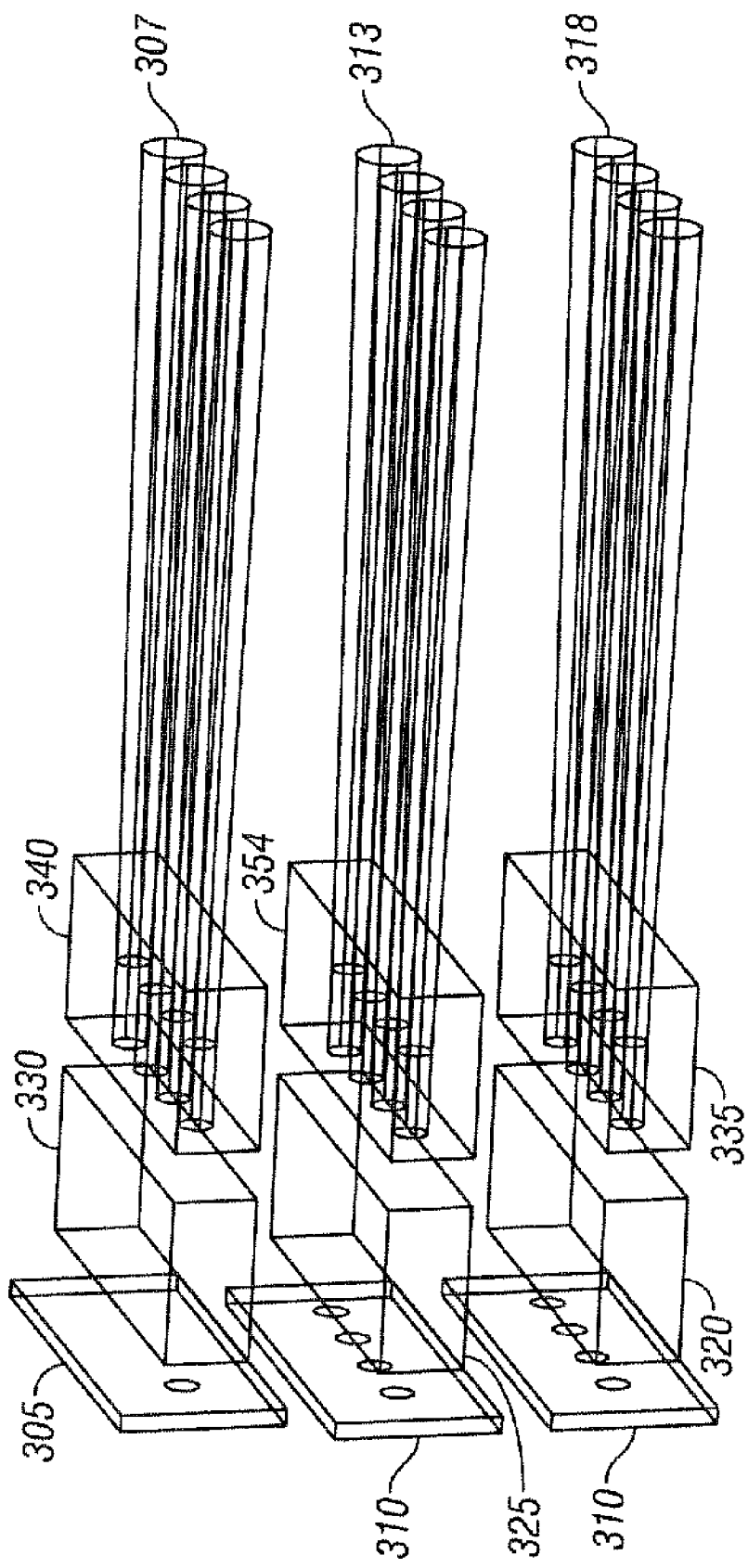
FIG. 3 is a schematic illustration of a three color laser illuminator which includes a set of frequency doubled monolithic VECSEL arrays for each color.

VECSELS can be used in power scaling configurations for display applications by creating arrays of laser devices. FIG. 3 shows a schematic layout of a set of three arrays of VECSELs, where each of three colors 307, 313, 318 is generated by a monolithic array that produces multiple beams. The arrays of VECSELS 305, 310, 315 are defined photolithographically during the wafer scale diode laser fabrication process. The laser cavity for each monolithic VECSEL array may be defined simultaneously for all the individual VECSEL emitters using a single VBG 335, 340, 354 or thin film dielectric filter component having lateral dimensions large enough to cover the entire array. The frequency doubling is provided by a single nonlinear optical chip 320, 325, 330 associated with each of the laser arrays 305, 310, 315. Such optical chips 320, 325, 330 can preferably be formed as a magnesium oxide doped periodically poled lithium niobate chip for improved ease of manufacturing and performance. Thus, power scaling of a FD VECSEL can be achieved by adding further emitters to the die while maintaining a standard cavity alignment and assembly process, enabling low-cost and high-volume automated assembly processes to be implemented.

In contrast, semiconductor laser sources other than VECSELs often have limitations such as a poor range of colors. For example, semiconductor edge emitting lasers are typically not available in the green portion of the visible spectrum; the red wavelength in edge emitting lasers is typically too long for optimal display color gamut and optical efficiency, and the blue wavelength of such lasers is typically shorter than optimal. Additionally, conventional edge emitting semiconductor lasers include red device performance that is very temperature sensitive, and blue devices are generally only available with low optical power. Moreover, light from edge emitting semiconductor lasers is difficult to couple into an LCD illumination system, because the emission divergence of the edge emitting laser is large and asymmetrical in the horizontal and vertical directions, which may require more complicated coupling optics to direct the laser light into the back panel of the display.

Other potential laser technologies which may be used to illuminate displays include gas lasers and diode pumped solid state lasers. However, gas lasers tend to be bulky and inefficient, and are only available at particular wavelengths which do not allow optimization of the display color gamut or the display luminous efficiency. Diode pumped solid-state lasers are difficult to manufacture at the blue wavelengths required for high color gamut displays. Such lasers are also costly because they require both expensive laser host crystal media and high-power laser diode pump sources.

The use of a set of frequency-doubled VECSEL lasers in a backlit LCD provides many advantages, including the ability to produce excellent color saturation because the spectral width of the laser output for each color is less than several nm. An extended color gamut is possible as compared with standard CCFL and LED illuminators, because the emission wavelength of each laser can be tailored to a particular or optimum value by control of a spectral filter in a VECSEL coupled to the design and growth of the semiconductor laser itself. The wavelength controllability of the VECSEL, coupled with its narrow spectral width, enables further extension of the color gamut by using more than 3 primary colors. VECSELs also offer advantages in coupling the illumination source to the display panel.

Linear arrays of VECSELs have optical properties that facilitate preferential expansion of light along one direction, which can provide a more uniform illumination across the area of a display panel. VECSELs also exhibit unit-to-unit consistent color balance due to the wavelength-selective grating or thin-film dielectric structure incorporated in the VECSEL laser cavity, which ensures wavelength stability over time as well as unit-to-unit reproducibility. Additionally, visible light primaries created by arrays of frequency-doubled VECSELs can reduce or eliminate speckle from the display, thus providing a high quality viewing experience.

Figure 4:
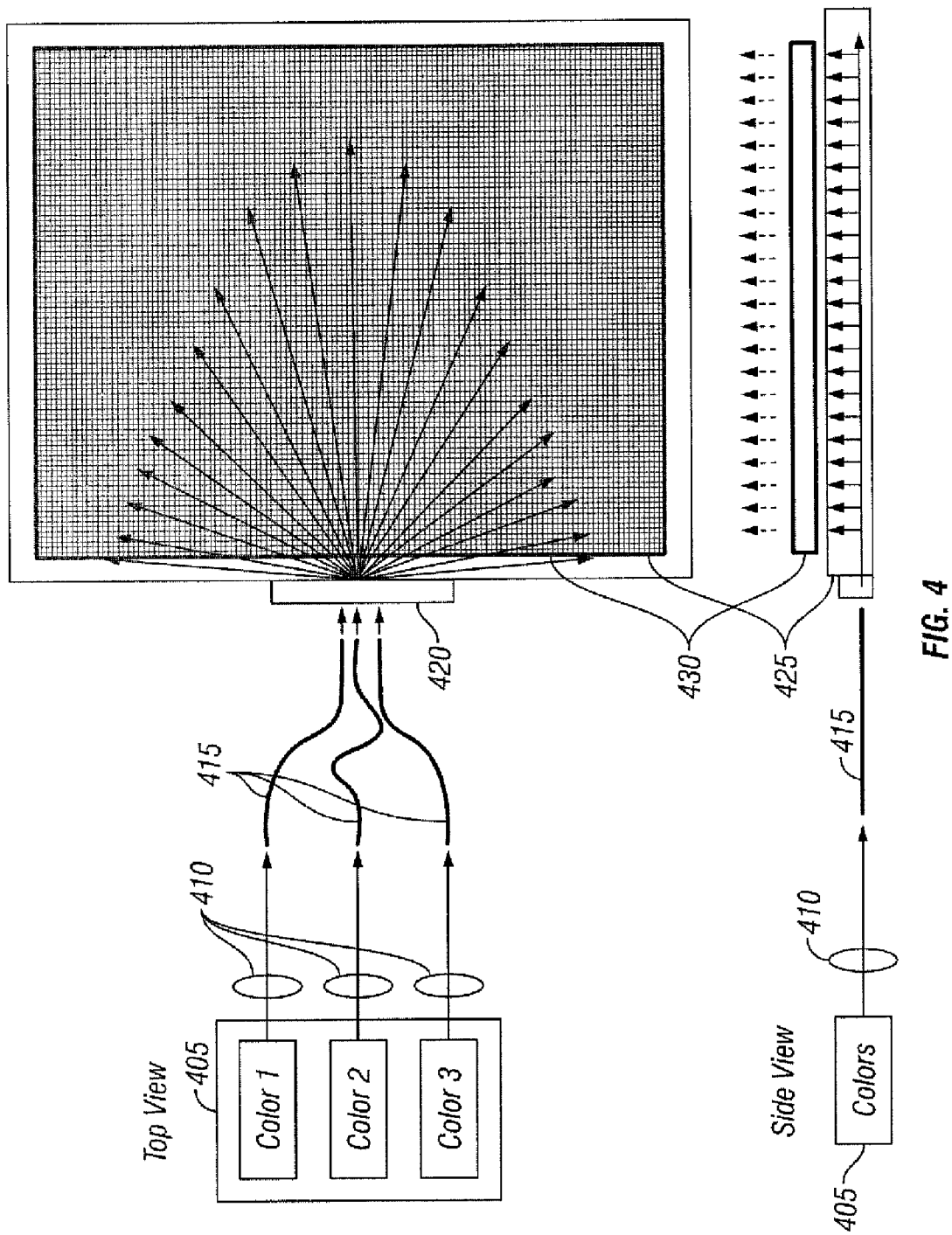
FIG. 4 is a schematic illustration of a laser-illuminated backlit LCD system.

In another embodiment, shown in FIG. 4, the laser source 405 is directed into optical fibers 415 using lenses 410, and transferred to an optical coupler 420 which includes a diffraction grating. The laser source 405 may be, for example, a RGB frequency-doubled VECSEL source. Each color can be provided by a single emitter or an array of emitters. Emitters of a single color can be monolithically integrated, and emitters can be provided in individual packages or grouped together in a single package.

VECSELs have optical beam characteristics that permit coupling of the light output of a single VECSEL source into an optical fiber using a simple, inexpensive singlet lens. An array of VECSEL devices may be used to increase the total illumination. Further, a simple molded aspheric lens may be used to simultaneously couple all the elements of the array in to a single fiber. For example, a large core glass optical fiber, with a core size of approximately 1 mm and an angular acceptance, or numerical aperture (NA), of about 0.48 may be used to provide a combination of efficient coupling of the laser source into the fiber and low loss transmission of the laser light to the optical coupler 420 and the LCD back panel 425, while avoiding damage to the fiber from the high-power visible light. Alternatively, optical fibers manufactured from appropriate damage-resistant plastic and polymer materials may be used.

In certain embodiments, a single fiber may carry all the optical power for each individual color. In further embodiments, multiple laser array sources may be coupled into multiple fibers to increase the power delivered to the display back panel for each color. The outputs of multiple single emitter lasers or laser arrays may be combined and directed into a single optical fiber, and a single optical fiber may also carry more than one illumination color. For example, a single optical fiber may be used to carry all three primary colors (red, green, and blue) used for the illumination of the display. In one embodiment, fibers carrying different colors of light are grouped into a bundle at their distal end, adjacent to an optical coupler.

In one embodiment, the distal end of optical fibers 415 carrying different colors of light are coupled to an optical coupler 420 which includes a diffraction grating and which distributes light from the laser source 405 into the back panel 425. The diffraction grating, e.g., a linear diffraction grating or other type of grating, is disposed on one side or edge of the back panel 425, adjacent to the distal end of the optical fibers 415. This grating spreads light from the fibers 415 in the plane of the back panel 425, and thus facilitates a uniform illumination of the LCD panel 430. The diffraction grating and optical coupler 420 are preferably located at or close to the center of one of the edges of the back panel.

A single optical element may be used to spread all colors of light. For example, a Machida grating (manufactured by Machida Endoscope Co., Tokyo, Japan and available from Mid-West Optics, Frankfort, Ill.) can be used which diffracts incident light into a 175-degree fan and includes 50 diffraction orders. Other types of grating can also be used, such as ruled gratings, replicated gratings, holographic gratings, etc. The diffraction grating can spread light in the plane of the back panel 425 while avoiding significant undesirable scattering or spreading of the light in a direction perpendicular to the back panel 425. When the light is spread through the plane of the back panel 425 of the display, multiple internal reflections and scatterings within the back panel 425 may further increase the uniformity of the light intensity, and scatter at least a portion of the light perpendicular to the plane of the back panel 425 such that it passes through the LCD panel 430 and provides illumination for the display. Other elements besides a grating may also be used to couple light from the optical fibers 415 into the back panel 425, including cylindrical lenses and Fresnel lenses.

Incorporation of optical fibers to direct light from laser sources to a display back panel allows the laser sources to be located remotely from the display panel itself. For example, the round symmetric output of a VECSEL can be easily coupled into an optical fiber which transmits the light from a VECSEL to the back panel of an LCD system. This allows remote location of the VECSEL light source with respect to the LCD panel. Thus, the location of the VECSEL source may be selected based on its physical dimensions, thermal management, and other factors. For example, the thickness and weight of a display panel can be reduced by locating the VECSEL light source remotely, which may also reduce the heat dissipated by the display panel itself.

Figure 5:
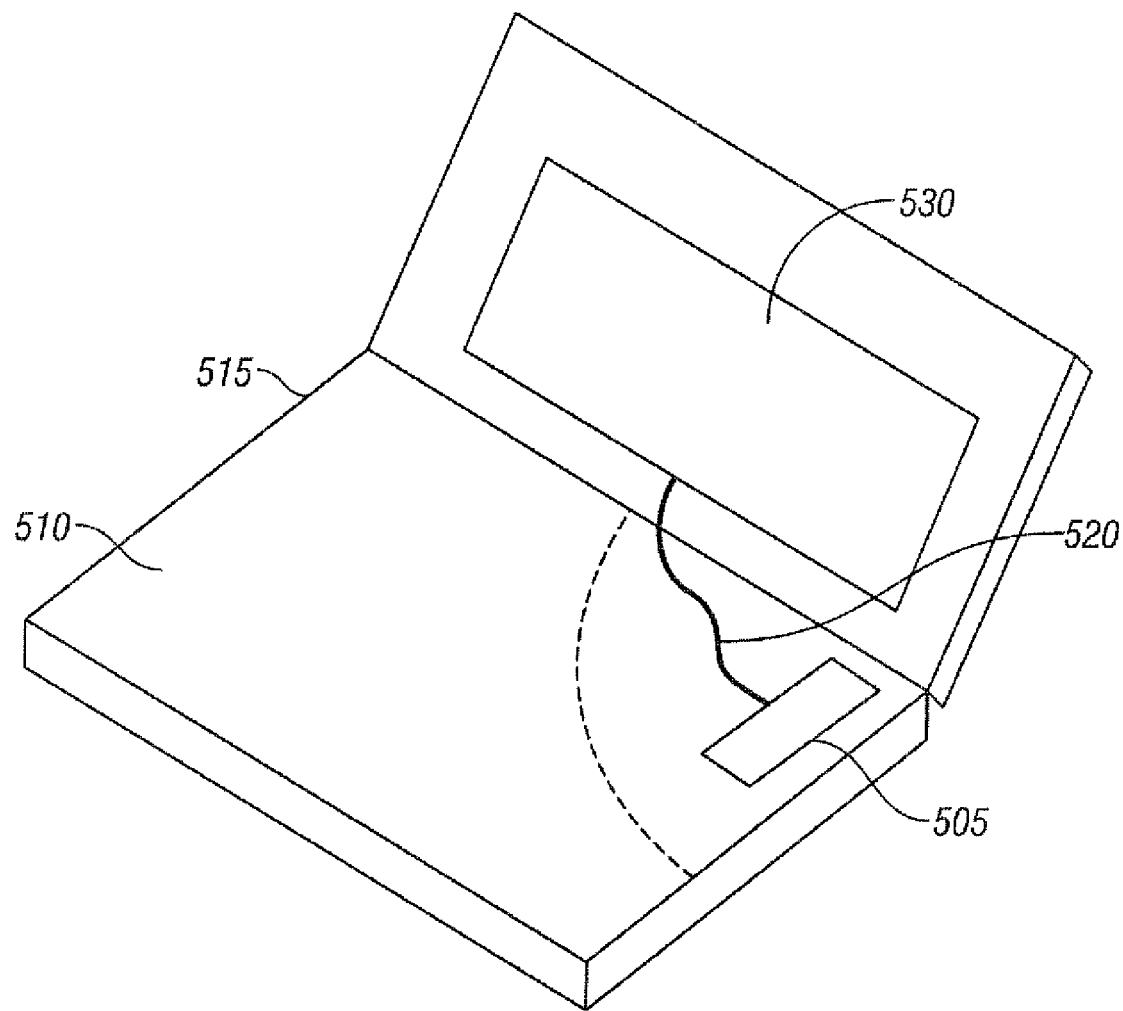
FIG. 5 is a schematic illustration of a laptop computer display which includes a fiber-delivered VECSEL laser set.

This advantage is shown schematically in FIG. 5, where the laser sources 505 are located in the base 510 of a lap top computer 515. Output light from the laser source 505 is coupled to the display panel 530 using optical fibers 520. The optical fiber connection is flexible, so the display can be swiveled and tilted without interrupting the display operation. The fiber connection can include one fiber per color, or it may be a fiber bundle containing multiple fibers for each illumination color, or a single fiber carrying all the colors needed for the display illumination.

A fiber-coupled laser source arrangement such as that shown in FIG. 5 provides several advantages. For example, the laser source 505 can be located anywhere in the base 510 of the computer, which facilitates convenient placement of all computer components in a crowded base 510 and allows optimization of the overall size of the device. Placement of the laser source 505 within the base 510 can be selected based on thermal considerations, e.g., the laser source 505 can be located adjacent to a fan or in another location which allows efficient dissipation of heat therefrom. Similarly, in a non-laptop computer flat panel display system, a laser source can be mounted in a control console and light from the source can be delivered to the LCD back panel via an optical fiber connection. This configuration reduces the size, weight, and heat dissipation of the display panel itself.

Figure 6:
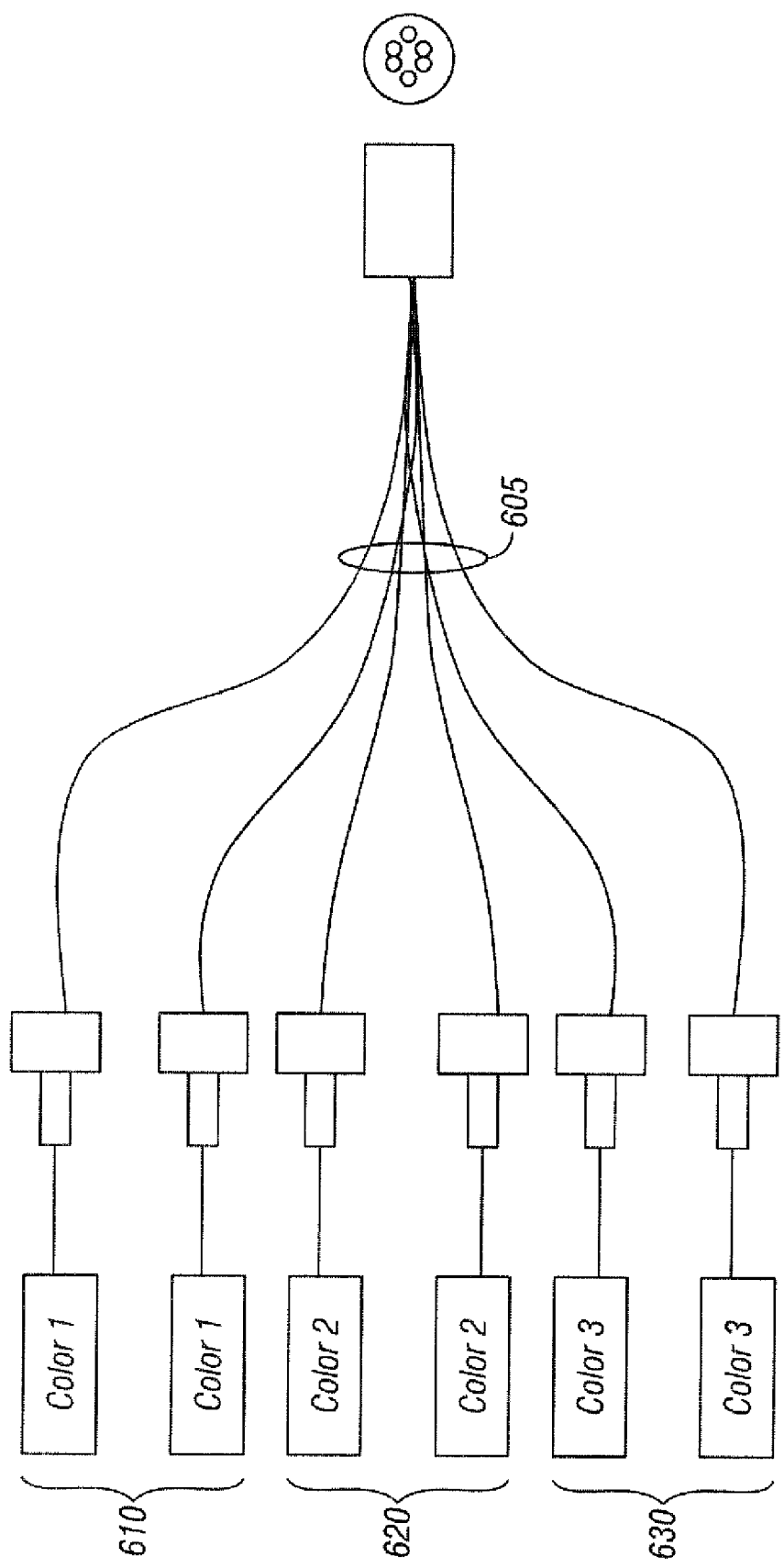
FIG. 6 is a schematic illustration of an illuminator which includes a fiber delivery cable and two lasers per color.

In a further embodiment, each color of light is provided by a plurality of sources. Each source may have a separate optical fiber to direct light to the display panel. FIG. 6 shows an optical fiber delivery system for a system which includes two lasers 610, 620, 630 per color and which uses six fibers 605 to carry three different colors of light. Alternatively, the light from several lasers emitting similar or different colors of light may be combined and directed into a single fiber. Multiple fibers carrying light from individual or multiple lasers can also be combined using fused-fiber-coupler techniques, such that the number of output fibers delivering the light to the display is different than the number of fibers originating at the laser sources.

Figure 7:
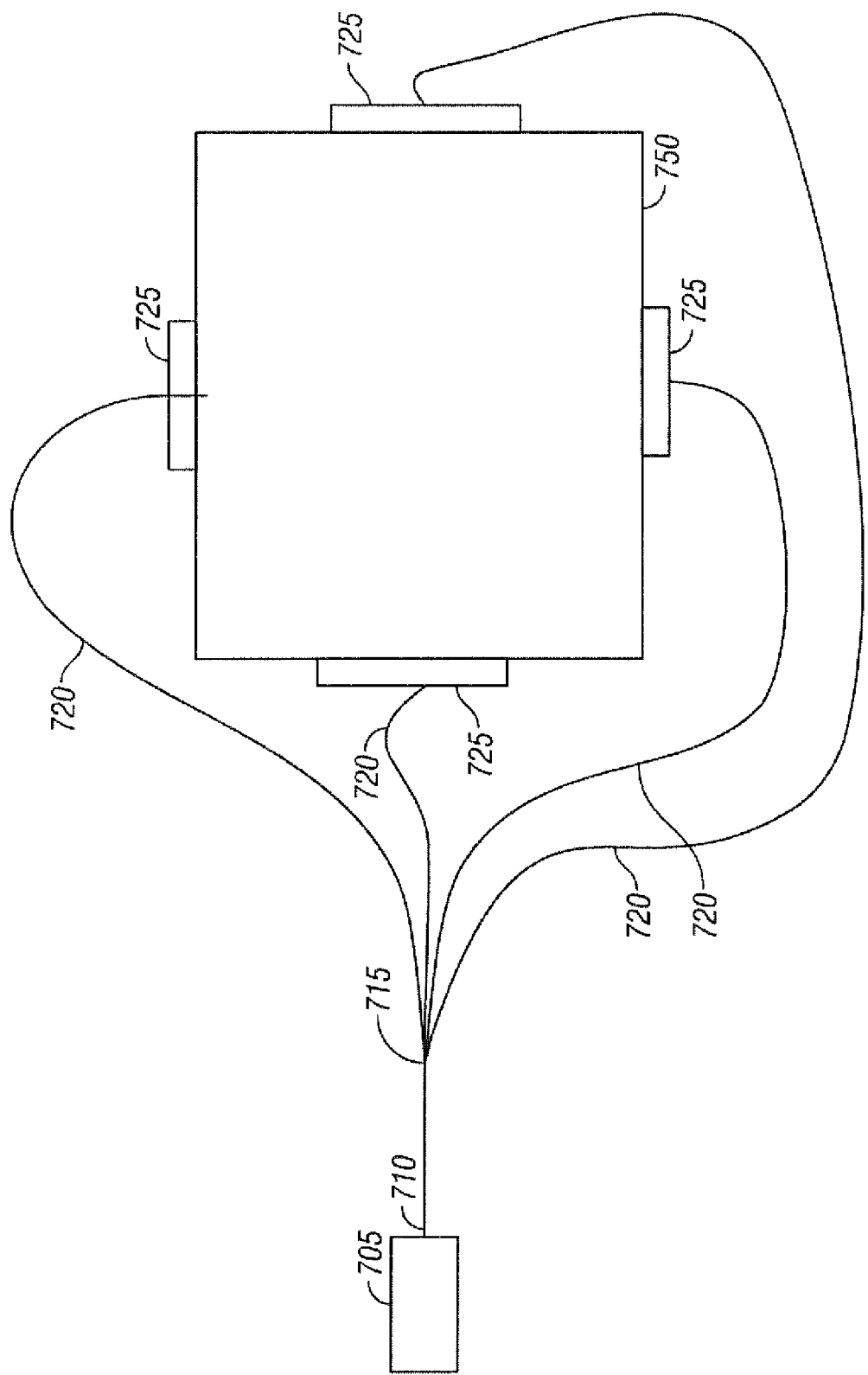
FIG. 7 is a schematic illustration of light distribution from a single set of laser sources to multiple locations on an LCD back panel.

In a further embodiment shown in FIG. 7, the light is provided by one or more lasers in a laser source 705 into a single optical fiber 710, which is then split into several paths along different optical fibers 720 using an optical splitter 715 such as a fused-fiber splitter or the like. In this way, light from the laser source 705 is delivered to multiple locations 725 along the back panel 750 of the display to further improve the uniformity of the display panel illumination. An optical coupler may be disposed at each location 725 along the back panel to distribute or spread the light exiting the fibers more uniformly over the back panel 750. A laser source 705, fiber 710, and optical splitter 715 may be provided for each of a plurality of colors as desired for the display illumination.

Figure 8:
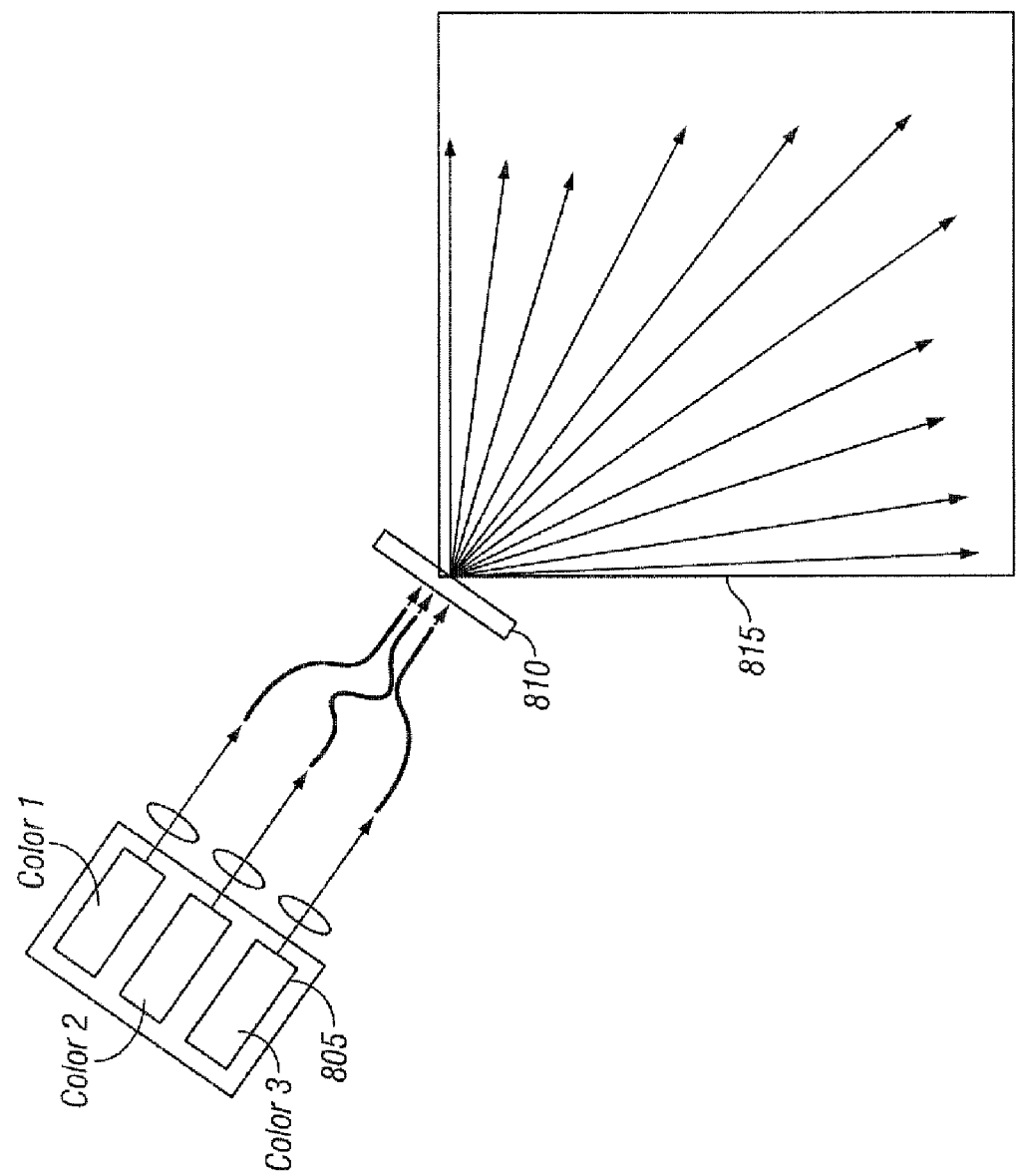
FIG. 8 is a schematic illustration of light from a set of laser sources coupled to the corner of a display back panel using optical fibers.

In a further embodiment shown in FIG. 8, an optical coupler 810 is located at a corner of the back panel 815. Light from the laser sources 805 is directed through the optical fibers 807 to the coupler 810, which can include a diffraction grating, which distributes the light over the back panel 815. Such optical couplers 810 can be located at more than one of the corners of the LCD back panel 815 to provide more uniform illumination thereof.

Figure 9:
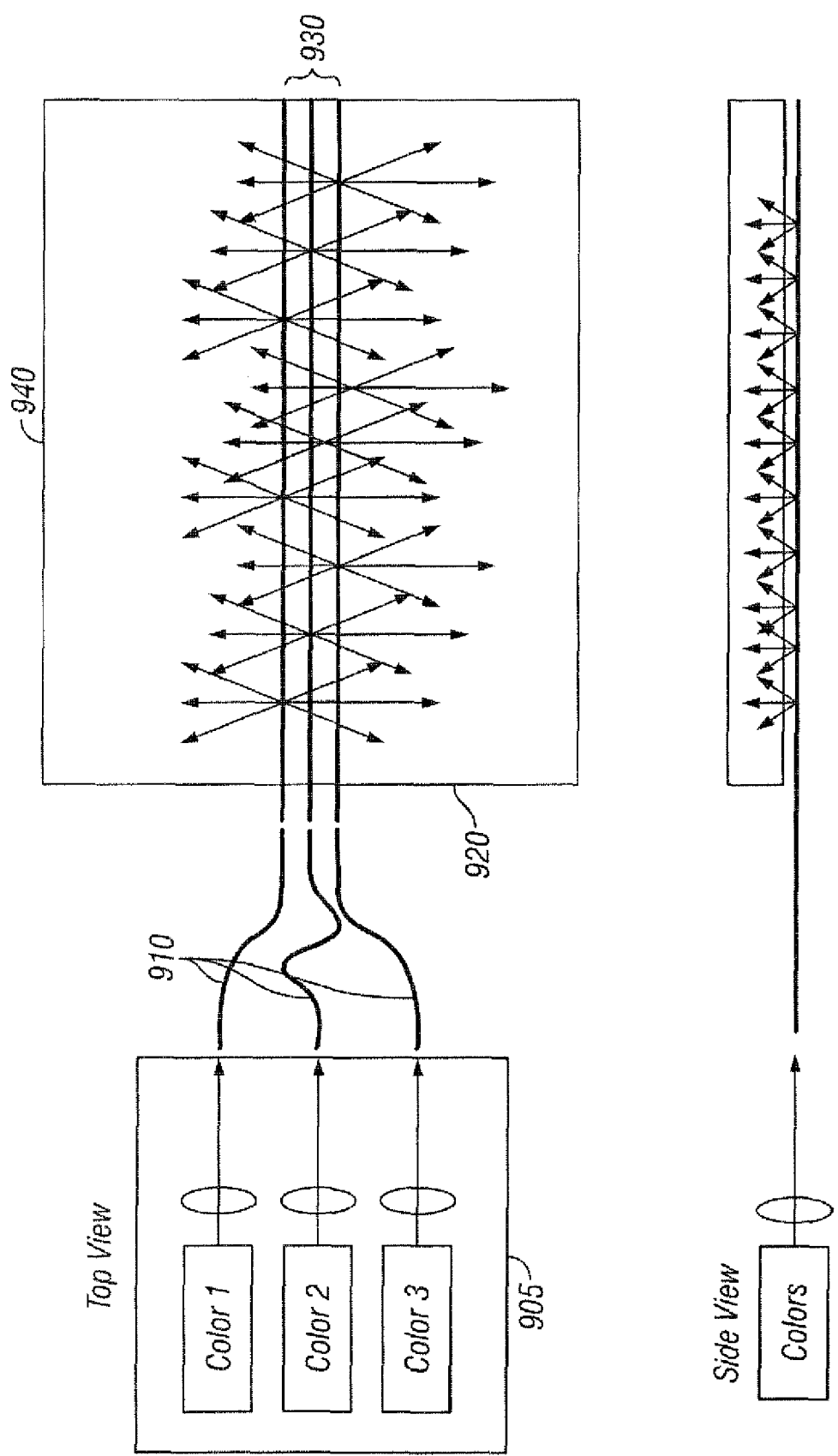
FIG. 9 is a schematic illustration of light from a set of laser sources coupled directly into the rear of a display back panel using optical fibers.

In another embodiment, shown in FIG. 9, optical fibers 910 may be used to directly distribute light from a laser source 905 across a back panel 940, without using an additional optical coupling component such as a diffraction grating. The optical fibers 910 are disposed across substantially the entire width (or length) of the back panel 920 such that they are able to distribute light directly across at least a portion 930 of the back panel 940. For example, each optical fiber 910 can be abraded or physically notched at various points along its length, which allows a portion of the light directed by the fiber 910 to be emitted from the notches or roughened region. Alternatively, the fibers can be provided as a bundle of small diameter fibers, each of which terminates at a different location and emits a portion of the light therefrom. For example, a fiber bundle having four fibers per color can distribute light of a particular color at four locations on the back panel. Much larger numbers of fibers can be used to provide more uniform illumination for each color.

Figure 10:
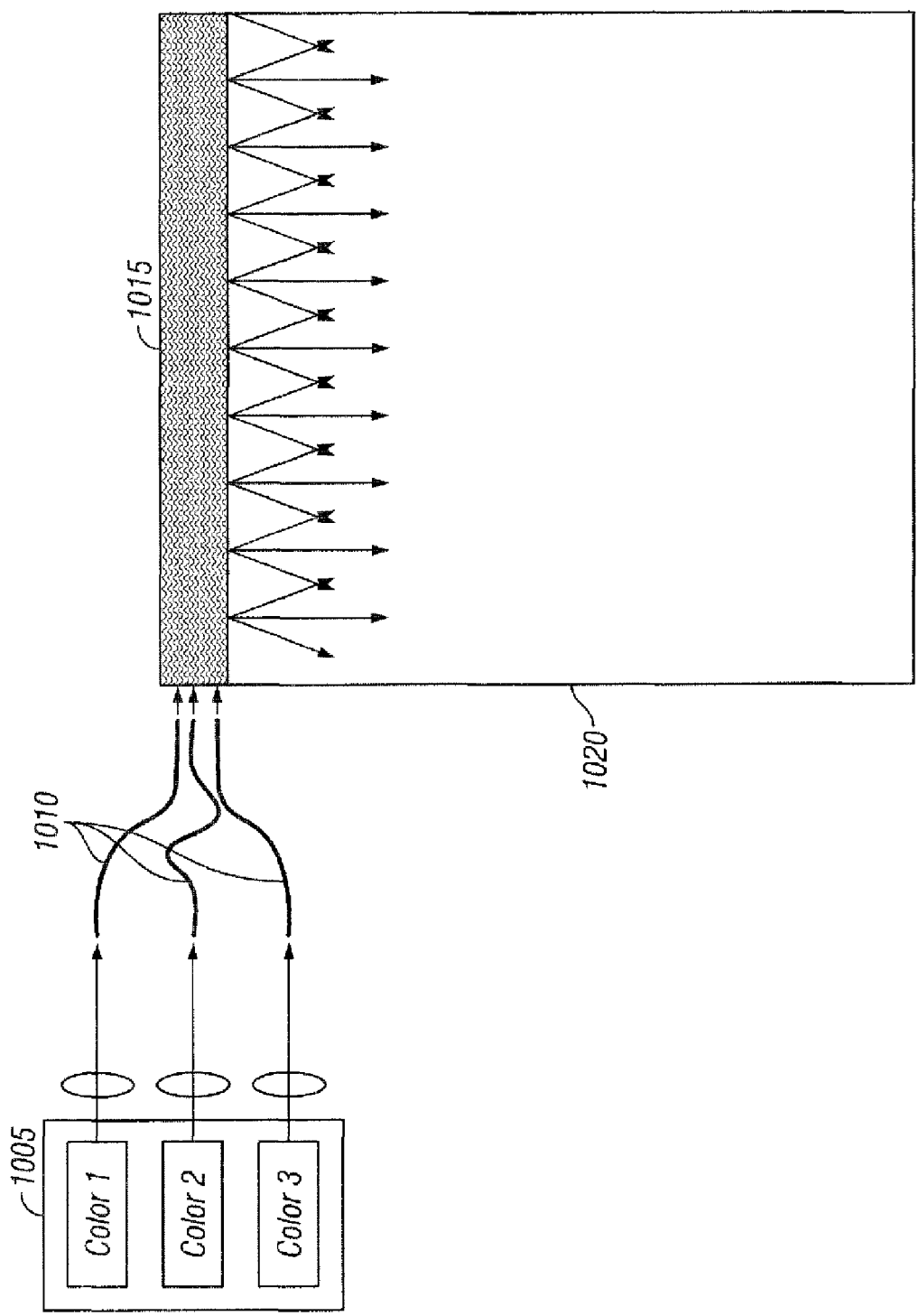
FIG. 10 is a schematic illustration of light from a set of laser sources coupled into a diffuser component located along an edge of a display back panel.

A further embodiment, shown in FIG. 10, includes a laser source 1005 which provides light through optical fibers 1010 to a diffuser component 1015 located along an edge of the LCD back panel 1020. The light propagates along the diffuser 1015 and is dispersed laterally into the plane of the back panel 1020 along the length of the diffuser 1015, thus providing a substantially uniform light distribution across the width of the back panel 1020 and a display adjacent thereto.

Many variations on the optical fiber connections described herein can be used. For example, bundles of smaller diameter fibers can be used instead of a single large diameter fiber. The fibers in the bundle can have a single common length or a plurality of lengths. The number of fibers in a bundle can be selected to match the number of individual laser emitters. For example, each emitter can be individually imaged into a proximal end of a single fiber. Alternatively, multiple laser arrays of one or more colors may be imaged into a single optical fiber for transport of emitted light to a back panel.

Figure 11:
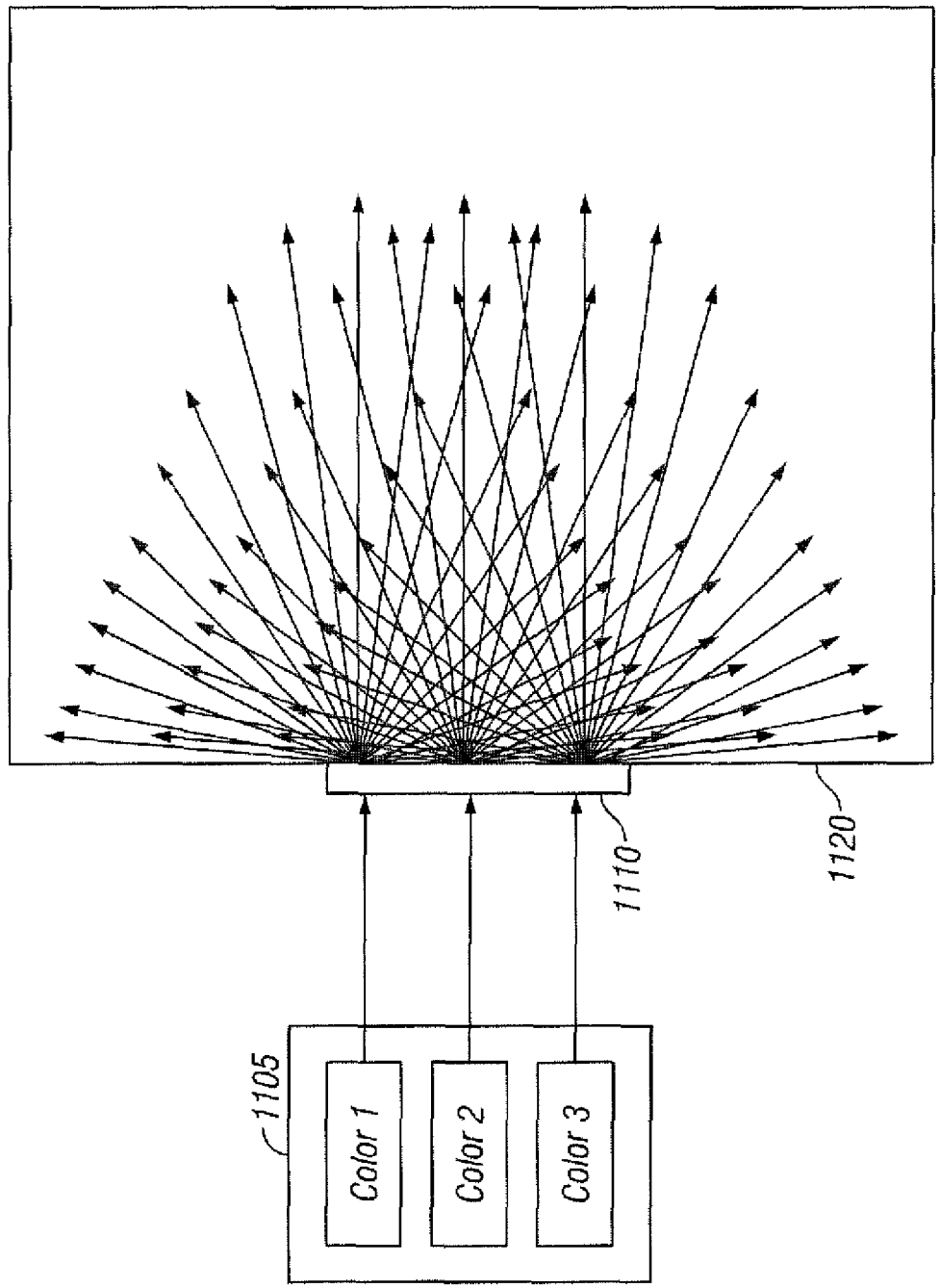
FIG. 11 is a schematic illustration of light from a set of laser sources coupled directly into a display back panel.

In another embodiment, illustrated in FIG. 11, light from a laser source 1105 is directed through free-space into an optical coupler 1110 to illuminate a display back panel 1120 without using optical fibers. The optical coupler 1110 can include a diffraction grating or other component which provides a more uniform distribution of light from the laser source 1105 over the area of the display back panel 1120.

Figure 12:
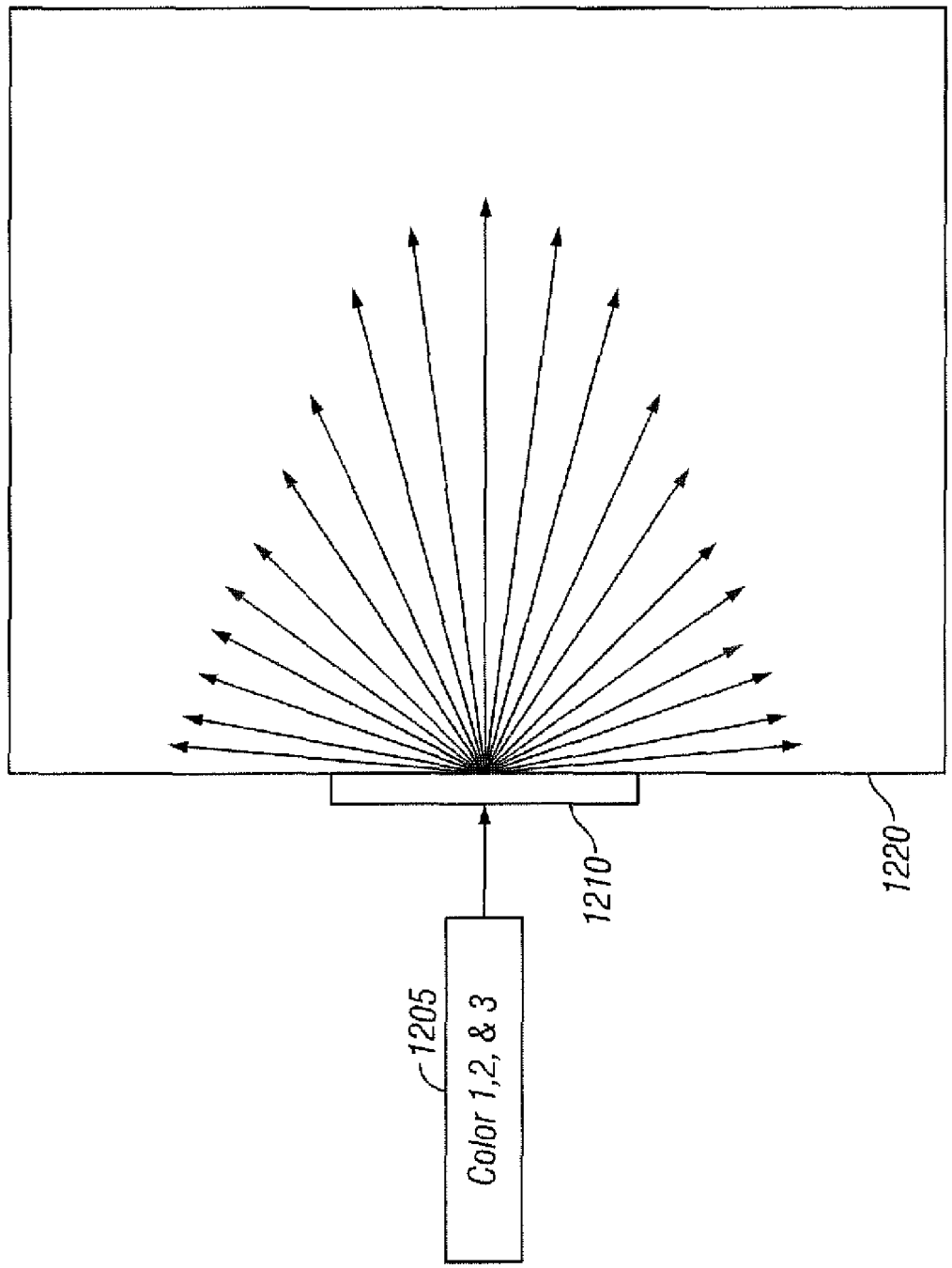
FIG. 12 is a schematic illustration of a plurality of colors of light emerging from a common aperture in a single laser package coupled directly into a display back panel.

In a further embodiment, shown in FIG. 12, the laser source 1205 is configured to emit all illumination colors from a single emission aperture. In this example, all of the colors of light impinge directly on a common location of the optical coupler 1210, which can include a diffraction grating or the like, and which distributes the light over at least a substantial portion of the back panel 1220.

Figure 13:
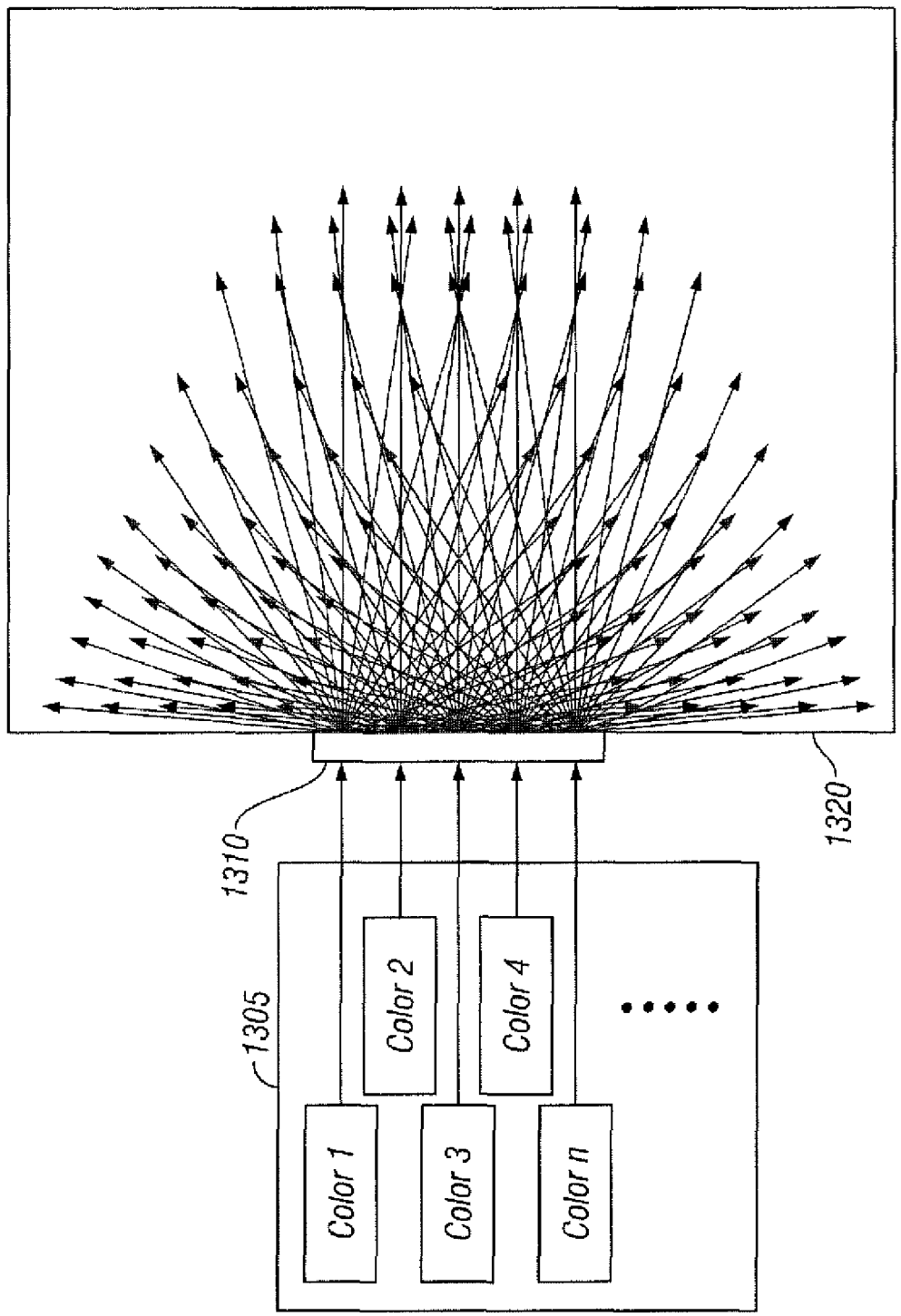
FIG. 13 is a schematic illustration of a display system with more than three colors used to illuminate an LCD panel.

FIG. 13 illustrates a further embodiment of the present invention, which includes a laser source 1305 that further includes a plurality of colors or primaries, and that is used to illuminate the back panel 1320 of an LCD system through the optical coupler 1310. For a color LCD panel, the number of colors or primaries is preferably at least 3 (e.g., red, green, and blue, which can produce a full color display). For a monochrome or partial color display, the number of colors may be less than three. If more than three colors are provided by the laser source 1305, the color gamut of the display may be improved based on the number of different colors than can be made by combining different amounts of the primaries. However, the available color gamut of such a display device is determined largely by the choice of the wavelengths (e.g., colors or primaries) provided by the laser source 1305. In principle, a color display with a source providing three optimized wavelengths can exhibit a greater color gamut than a display with a source having more than 3 primary colors.

In the embodiment shown in FIG. 13, optical coupling between the laser source 1305 and the optical coupler 1310 is through free space. However, this coupling can be provided using any of the techniques described herein, either with or without optical fibers.

The operation of the laser sources in the embodiments described herein may also be adjusted to provide different modes of operation which can optimize the display of an image. For example, laser sources which include frequency-doubled VECSELs may be operated in a continuous wave (cw) mode or a quasi-cw mode to improve brightness and electrical-to-optical efficiency of the display system. The display may be designed such that all the colors of laser are turned on at all times, or alternatively, the VECSELs may be operated sequentially, such that one or more colors are turned on or off sequentially, in time with one another and/or synchronized with interleaved scan lines of the display. The power output of the VECSELs may be adjusted to achieve dynamic adjustment of screen illumination intensity, since the VESCEL power output can be rapidly modulated to alter overall brightness level to an image. Such dynamic adjustment of screen illumination intensity can be used, for example, to globally reduce display light level in darker images and therefore improve the display contrast ratio for dark scenes. This capability can help compensate for the limited dynamic range of LCD pixels, since such pixels do not turn off completely and tend to allow some light leakage even in the off state.

Figure 14A:
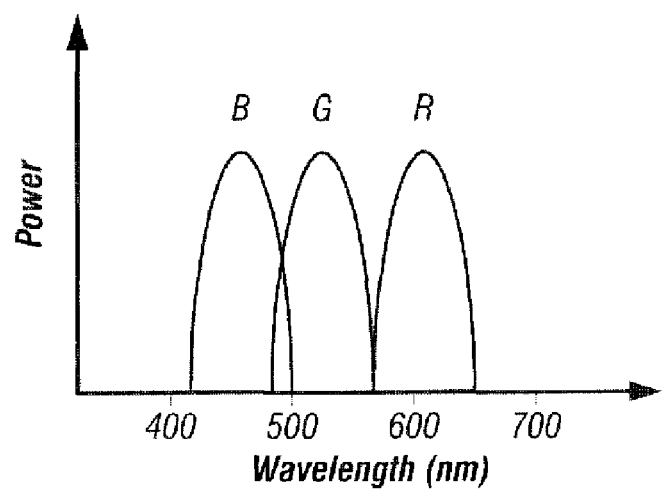
FIG. 14A is a plot of illumination spectra for a conventional backlit system.

In another embodiment of the present invention, the laser backlight illumination system includes two closely spaced wavelengths for each color in the display, instead of a single wavelength for each of the primary (e.g., red, green, and blue) wavelengths. FIG. 14A illustrates the illumination spectrum of a conventional backlit system using CCFL or LED sources, in which the spectral width of each color exceeds 10 nm and is defined by the color filters incorporated into the display panel. As described herein, the spectral width of the colors for CCFL and LED sources represent a trade-off between brightness and efficiency of the display system. The CCFL and LED sources have relatively broad emission spectra, so using a narrow color filter to create a narrow primary color spectrum reduces the transmitted light power and therefore decreases the brightness and/or efficiency of the display.

Figure 14B:
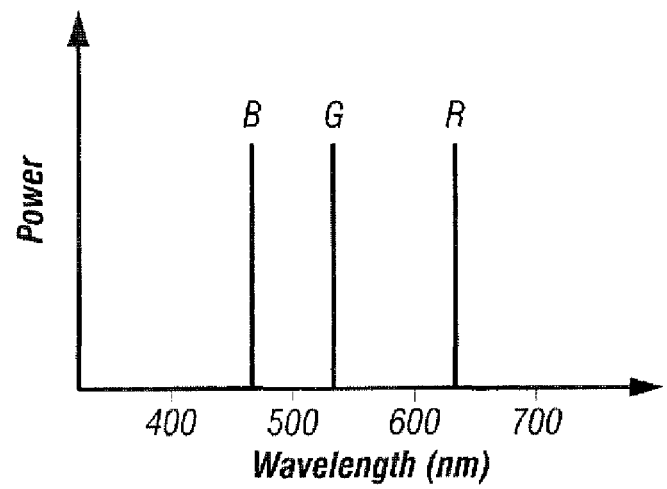
FIG. 14B is a plot of illumination spectra for a VECSEL-based single color set system.
Figure 14C:
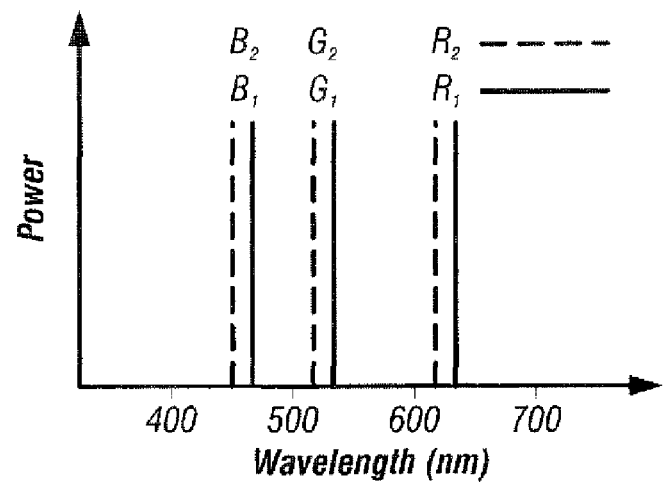
FIG. 14C is a plot of illumination spectra for a VECSEL-based two color set system.

FIG. 14B illustrates a single color set laser/VECSEL-based backlit LCD system, with the spectral width of each primary color being less than several nm. FIG. 14C illustrates a two color set laser/VECSEL-based backlit system. A viewer may not perceive a difference in an image produced by one color set or the other color set if the wavelengths and powers of the primary colors are correctly chosen. However, the two different color sets can be used to provide a spatial offset of an image to generate a stereoscopic effect. For example, a viewer may wear glasses with narrow band pass filters, for which a filter in one eye passes one color set and a filter in the other eye passes the other color set. The images formed by the two color sets can be spatially offset at the display panel, thus displaying a stereoscopic image to the viewer. Alternatively, a stereographic image can be achieved by interleaved scanning, where alternative rows of pixels display only one of the two color sets. Since the laser sources have narrow spectra, the brightness and efficiency of the two-color-set display is not adversely affected by the introduction of the narrow band pass filters. Such bright and efficient stereographic effects are not possible using conventional CCFL and LED illumination techniques.

Figure 15:
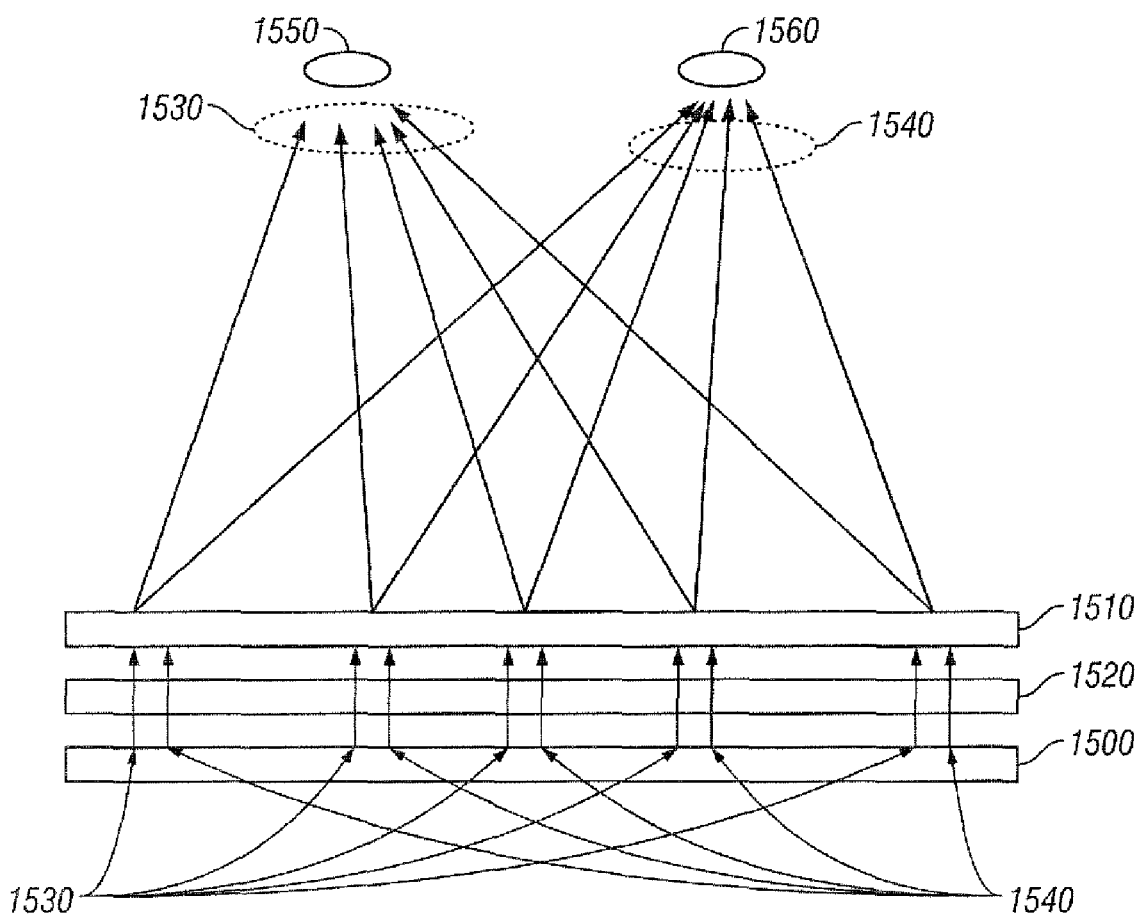
FIG. 15 is a schematic illustration of a stereoscopic LCD-based viewing system which uses angular separation to produce a stereoscopic image.

In an alternative embodiment of the two color set laser illuminated display, illustrated in FIG. 15, images may be angularly offset to generate a stereoscopic effect. Light from two color sets 1530, 1540 which illuminates a back panel 1500 passes through a flat panel LCD matrix 1520. One or more dispersive elements 1510 on the front surface of the LCD matrix 1520 direct light from each color set 1530, 1540 towards a different eye 1550, 1560. The dispersive element 1510 can include, e.g., an array of diffraction gratings with pitch and blaze adjusted to deflect the light from each color set 1530, 1540 towards a particular eye 1550, 1560.

Although most embodiments of illuminated displays described herein include at least three colors, embodiments of the present invention may also be used for illumination of monochrome or dichromatic display systems having just one or two laser colors. The various embodiments described herein may be combined in various combinations to create alternative embodiments of the present invention.

Embodiments of the present invention can also be used to illuminate panels for other types of displays in addition to LCD panels. For example, the illuminated back panels described herein can be provided in proximity to other types of transmissive displays. Alternatively, such panels can be provided in front of reflective displays, such as so-called "electronic ink" or "electronic paper" displays, to provide substantially uniform illumination of such displays.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The particular embodiments were chosen and described in order to explain the principles of the invention and its practical applications, and to enable others skilled in the art to utilize the invention and various embodiments thereof with various modifications as may be suited to particular uses. All patents, patent applications, and other publications cited herein are incorporated herein by reference in their entireties.

What is claimed is:

1. A display apparatus, the display apparatus comprising:
   a liquid crystal display (LCD) panel on which is formed an image to be viewed by a user when looking directly at the LCD panel; and,
   a backlight for providing backlighting to the LCD panel at an intensity that allows the image formed on the LCD panel to be viewed by the user when looking directly at the LCD panel, the backlight including:
      a plurality of frequency-doubled vertical extended cavity surface emitting lasers that generate visible light, and
      an optical coupling arrangement configured to spread the visible light so as facilitate substantially uniform backlight illumination for the LCD panel.

2. The display apparatus of claim 1, wherein the visible light is generated to include three primary wavelengths.

3. The display apparatus of claim 2, wherein the optical coupling arrangement comprises an optical diffuser.

4. The display apparatus of claim 3, wherein the optical diffuser comprises at least one of an optical grating, a cylindrical lens, or a Fresnel lens.

5. The display apparatus of claim 2, wherein the optical coupling arrangement comprises a plurality of optical fibers.

6. The display apparatus of claim 5, wherein the optical coupling arrangement further comprises an optical diffuser.

7. The display apparatus of claim 6, wherein the optical diffuser comprises at least one of an optical grating, a cylindrical lens, or a Fresnel lens.

8. The display apparatus of claim 6, wherein the optical diffuser is provided along a side of the LCD panel.

9. The display apparatus of claim 5, wherein the optical coupling arrangement further comprises a plurality of optical diffusers.

10. The display apparatus of claim 9, wherein the plurality of optical diffusers are provided along a plurality of sides of the LCD panel.

11. The display apparatus of claim 5, wherein the optical coupling arrangement further comprises an optical diffuser located at a corner of the LCD panel.

12. The display apparatus of claim 1, wherein each primary wavelength of the visible light is generated by a subset of at least two of the plurality of frequency-doubled vertical extended cavity surface emitting lasers.

13. The display apparatus of claim 1, wherein the visible light is generated at more than three primary wavelengths.

14. The display apparatus of claim 1, wherein the visible light is emitted through a single aperture.

15. A backlight device comprising:
   a plurality of frequency-doubled vertical extended cavity surface emitting lasers that generate visible light; and
   an optical coupling arrangement configured to spread the visible light so as facilitate substantially uniform backlight illumination for a display panel;
   wherein the backlight illumination is provided at an intensity that allows an image formed on the display panel to be viewed by a user when looking directly at the display panel.

16. A backlight device as in claim 15 wherein the display panel is a transmissive display panel.

17. A backlight device as in claim 15 wherein the display panel is a reflective display panel.

18. A method for providing backlighting to a display panel, the method comprising:
   generating visible light using a plurality of frequency-doubled vertical extended cavity surface emitting lasers, the visible light being generated at an intensity that allows an image formed on the display panel to be viewed by a user when looking directly at the display panel;
   spreading the visible light so as to provide substantially uniform backlight illumination to the display panel.

19. The method of claim 18, wherein the display panel is an LCD panel.

20. A display apparatus, the display apparatus comprising:
   a liquid crystal display (LCD) panel on which is formed an image to be viewed by a user when looking directly at the LCD panel; and,
   a backlight for providing backlighting to the LCD panel at an intensity that allows the image formed on the LCD panel to be viewed by the user when looking directly at the LCD panel, the backlight including:

a plurality of frequency-doubled vertical extended cavity surface emitting lasers that generate visible light, and
an optical coupling arrangement configured to distribute the visible light to provide the backlighting to the LCD panel, wherein the optical coupling arrangement further comprises an optical diffuser, the optical diffuser including at least one of notches in the optical fibers, abraded surfaces of the optical fibers, or spatially-separated distal ends of the optical fibers.

* * * * *